Figure 1:
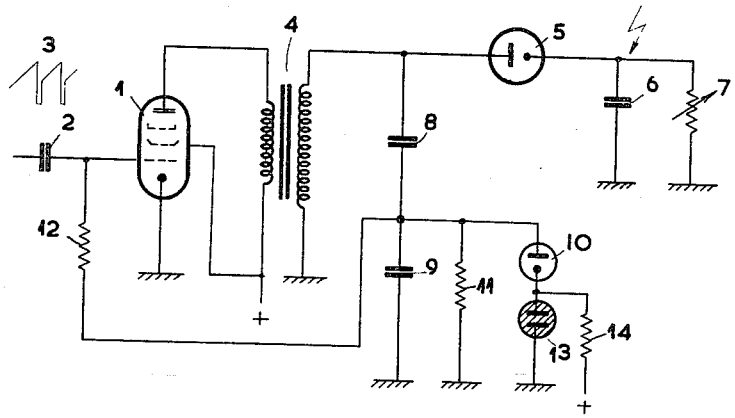

Aug. 28, 1962   K. KRÖNER   3,051,888
CIRCUIT ARRANGEMENT FOR STABILIZING THE
AMPLITUDE OF A HIGH DIRECT VOLTAGE
Filed Feb. 19, 1958   2 Sheets-Sheet 1

INVENTOR
KLAUS KRÖNER
BY
AGENT

United States Patent Office 3,051,888
Patented Aug. 28, 1962

3,051,888
CIRCUIT ARRANGEMENT FOR STABILIZING THE AMPLITUDE OF A HIGH DIRECT VOLTAGE
Klaus Kröner, Hamburg-Fuhlsbuttel, Germany, assignor to North American Philips Company, Inc., New York, N.Y., a corporation of Delaware
Filed Feb. 19, 1958, Ser. No. 716,201
Claims priority, application Germany Mar. 28, 1957
6 Claims. (Cl. 321—2)

The invention relates to a circuit arrangement for stabilizing the amplitude of a high direct voltage, which is obtained by rectifying pulses occurring at a transformer, which is included in the output circuit of an amplifying stage supplying a periodically interrupted current.

Such an arrangement is preferably employed in a television receiver, in the deflection section of which a sawtooth current is produced having a gradually ascending leading edge and an abrupt flyback for the line deflection coil, the pulses produced during the flyback being rectified, subsequent to transformation. The resultant direct voltage is used for feeding the cathode-ray reproducing tube.

The high voltage source has, as is known, a comparatively high internal resistance, so that the direct voltage varies in a troublesome manner when the load varies, i.e. when the mean image brightness changes. Arrangements are known, in which voltages derived from the high direct voltage and, as the case may be, from the direct load current are used as a control signal. However, since only a small loading of the high-voltage circuit is allowed and since the direct load current can be converted into a control-magnitude only with difficulty, the requirements for such arrangements are comparatively severe.

In an arrangement of the kind described above, these disadvantages are avoided, whilst a material reduction of the internal resistance of the high direct-voltage source can be readily obtained, if, in accordance with the invention, a control-voltage is derived from the pulses supplied to the rectifying circuit in a second rectifier, so that the value at which the current is interrupted, is varied to such an extent that, upon a diminution of the amplitude of the direct voltage, the peak value of the current increases considerably and the pulse amplitude remains at least substantially constant.

This is based on the recognition of the fact that the internal resistance of the high direct voltage source is mainly due to the sawtooth current source and particularly to the internal resistance, especially to the stray inductance of the transformer, whilst the rectifying circuit itself, consisting of one or more diodes, contributes only little to the internal resistance.

It is therefore sufficient to stabilize the amplitude of the pulses supplied to the rectifying circuit; as compared with direct-current circuits, this is materially simpler, since, as is known, with alternating voltages a voltage division or an amplification can be carried out in a materially simpler manner and also at a lower loss of power than similar manipulations can be carried out with direct voltages.

It should be noted that it is known per se to stabilize the amplitude of the sawtooth current of a television deflection circuit by rectifying the fly-back pulses at the primary winding of an output transformer and to use the resultant control-voltage to vary the working point of the output tube of the deflection circuit.

Thus, no fixed coupling is formed between the rectifying circuit associated with the control-arrangement and the secondary winding of the output transformer, so that only a partial stabilization of the high direct voltage can be obtained.

It should furthermore be noted that it is known, to stabilize the high voltage by means of a control-voltage obtained from an auxiliary winding provided on the transformer and to supply it, subsequent to rectification, to the grid of the output tube of the amplifier, which supplies the current. In this case also no fixed coupling was formed between the rectifying circuit, associated with the control-circuit, and the point of derivation of the pulses for the high-voltage circuit and it was therefore impossible in this manner to obtain a satisfactory control, so that the arrangement had to be completed by a control-voltage part varying with the direct load current.

With an arrangement according to the invention one voltage-dependent control is already capable of providing a material improvement, if it is only considered that the pulses supplied to the control circuit should be as far as possible proportional to the pulses occurring at the input of the rectifying circuit. This is particularly achieved, when the pulses for the control circuit are obtained via a capacitative voltage-divider from the input terminal of the rectifier.

With an arrangement according to the invention a threshold voltage may be rendered effective, in known manner, in the control circuit, so that the steepness of the control can be materially improved. If this threshold voltage is controlled in accordance with the load current of the high-voltage rectifier, an additional control is obtained, so that a complete compensation of the internal resistance can be realized. By a corresponding proportioning of this additional control, also the influence of components of the internal resistance can be compensated, which influence may be due to the rectifier and, if any to a smoothing member which may be provided after the rectifier.

It is particularly advantageous to control the threshold value of the control-voltage in accordance with the pulses via the primary winding of the transformer, so that with an increase in amplitude of these pulses the current of the output amplifier increases.

Since, as stated above, the internal resistance of a high direct-voltage source may be formed mainly by the stray inductance of the transformer, it appears that the difference between the pulses on the primary side and those on the secondary side is approximately proportional to the load current. Without any change in the direct-voltage circuit, a control-magnitude varying with the load is thus obtained, so that a complete compensation, even an over-compensation may be achieved.

The invention will now be described more fully with reference to the drawings.

Figure 2:
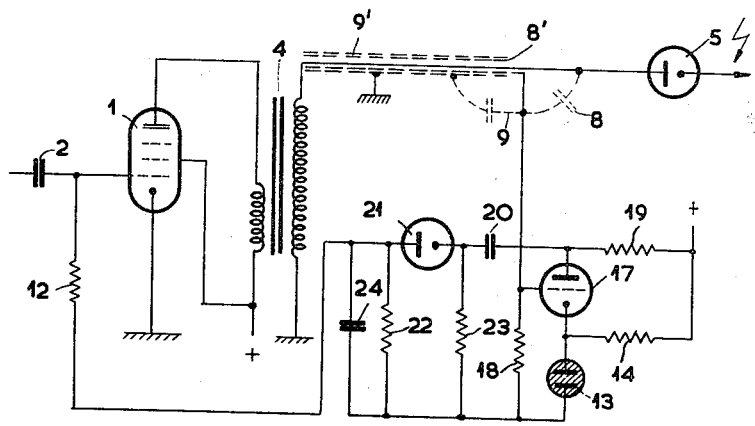
Figure 3:
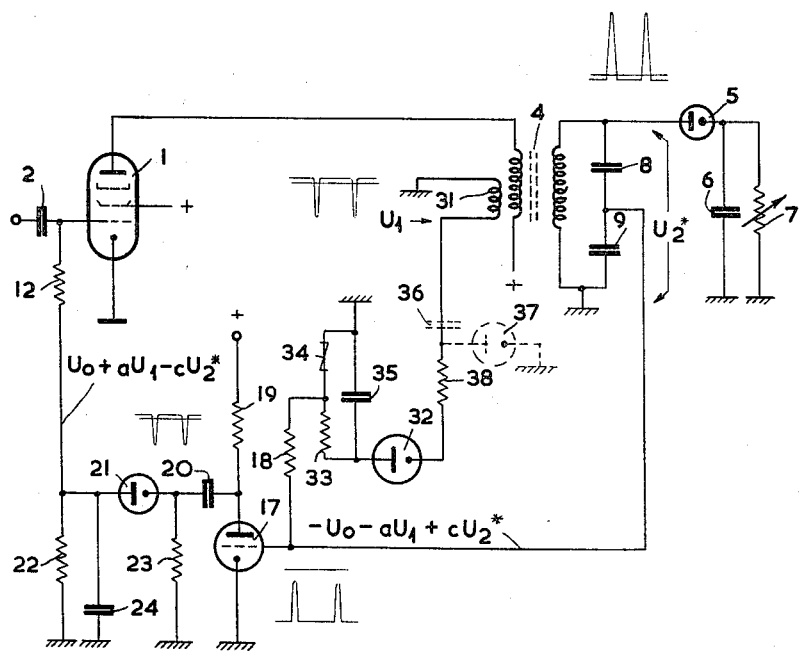

FIG. 1 shows the output circuit of a line-deflection circuit in a television receiver, FIG. 2 shows an improved circuit and FIG. 3 shows a circuit in which the internal resistance of the high voltage source is made nearly equal to zero.

The circuit of FIG. 1 comprises a pentode 1, the cathode of which is connected to earth and to the control-grid of which is supplied, via a coupling capacitor 2, a substantially sawtooth control-voltage 3, which is interrupted by cut-off pulses.

The anode circuit of the pentode 1 includes a transformer 4, the primary winding of which is included between the positive terminal of the voltage supply and the anode of the tube 1. The screen-grid of tube 1 is also connected to the voltage source. The secondary winding of the transformer 4 is connected to the anode of the diode 5, at the cathode of which occurs a high direct voltage, which may, for example, be 12 to 15 kv. This direct voltage is smoothed by a charging capacitor 6 and loaded by a cathode-ray tube, represented here by a variable resistor 7, in dependence upon the mean brightness of a reproduced image.

The high-voltage pulses occurring at the secondary winding of the transformer 4 during the cut-off time of the control-voltage 3 are supplied not only to the anode of the diode 5, but also to a capacitative potentiometer comprising two capacitors 8 and 9, this potentiometer being connected to earth on the other side. Since the further control-circuit requires only a much smaller control-voltage the capacitor 8 may have a comparatively low capacity, for example between 1 and 2 micromicrofarads, whereas the capacitor 9 must have a materially higher capacity between 100 and 500 micromicrofarads.

The positive pulses occurring at the capacitor 9, the amplitude of which is materially reduced, are supplied to the anode of a diode 10, the required direct-current loop being completed by a resistor 11, connected in parallel with the capacitor 9. Thus, across the capacitor 9 a negative voltage is produced, which serves for the control of the working point of the pentode 1, to which end it is supplied via a separation resistor 12, to the grid of the tube 1. With a decreasing output amplitude, as may occur, for example due to an increase in load, the negative bias voltage of the tube 1 decreases, so that the anode current thereof increases and also the high-voltage pulses are raised.

Between the cathode of the diode 10 and ground is connected, moreover, a voltage-stabilizing tube 13, to which is supplied, via a series resistor 14, a positive current from the voltage source, this current maintaining the glow discharge. The voltage across the tube 13 may, for example, be 85 v. to 140 v. or more, since a sufficiently high voltage is available.

The stabilizing tube 13 provides that only the pulse peaks, which exceed the ignition voltage operating as a threshold voltage, supply a control-voltage. Therefore, higher voltage pulses may be admitted at the capacitor 9, so that a correspondingly higher control-steepness is obtained.

The capacitor 8 may be formed by a conductive body, for example a metal strip arranged in the neighbourhood of the high-voltage winding. In order to adjust the desired value of the high-voltage, this body may be moved more or less close to the high-voltage winding, for example by bending it or by means of a set screw, which is actuated by a member preferably of poor capacitance.

FIG. 2 shows an arrangement similar to that of FIG. 1, in which the capacitative potentiometer 8, 9 is constituted by the conductive coatings 8' and 9' of a cable connected between the transformer 4 and the diode 5. These coatings may be formed by a metal network or simply by a conductive lacquer, since only extremely low currents of a few μa. flow through the coatings.

The envelope surrounding the inner conductor is coated by a layer 8', which has only low capacitance with respect to the inner conductor, and which corresponds to the counter-coating of the capacitor 8 of FIG. 1. This layer is surrounded by a conductive envelope 9', having a materially higher capacity relative to the coating 8', the envelope 9' being connected to ground.

The capacity ratios are determined by the surfaces concerned. They may furthermore be varied in a desired manner by a variation in the thickness of the insulating layers, particularly by a variation in the thickness of the layer between the coatings 8' and 9'. Since the outer envelope is connected to earth, the cable is screened and the irradiation of electrostatic fields is prevented as far as possible.

The pulse voltage obtained from the coating 8', of for example 250 v., with a smaller amplitude, is supplied, as is shown in FIG. 2 to the grid of an amplifying tube 17, this grid being connected to ground through a comparatively high ohmic resistance 18, of for example 500K ohms.

Since, in this case, in contradistinction to FIG. 1, the control-voltage is not obtained by a direct rectification of the pulses, the high voltage is still less loaded, so that even smaller dividing capacitances are sufficient (cf. 8 and 9 of FIG. 1). Since the high-voltage pulse corresponds, as is known, to a free half oscillatory period of the circuit formed by the inductance of the transformer 4 and the associated parasitic capacity, an increase in this parasitic capacity by means of the capacitor 8 may bring about a certain prolongation of the fly-back and a decrease in the peak voltage, which is often unwanted. Accordingly, it is desirable to reduce the loading on the system and this may be effected by the use of an amplifier tube 17. This arrangement furthermore has the advantage that the control voltage may be amplified thereby increasing the effectiveness thereof.

Between the cathode of the tube 17 and earth is connected a voltage-stabilizer 13, which is also operative as a threshold. The anode of the tube 17 is connected on the one hand via a resistor 19, of for example 10K ohms, to the voltage source and on the other hand via a separation capacitor 20 to the cathode of a rectifier 21, for example a diode, the anode and cathode of which are connected to earth, via resistors 22 and 23 respectively (for example of 390 and 47K ohms respectively). The resistor 22 is connected in parallel with a smoothing capacitor 24.

The voltage peaks exceeding the threshold voltage of tube 13, at the grid of the tube 17, are amplified and supplied to the rectifying circuit 21, 22, 23. They control, moreover, the working point of the pentode 1.

With an increasing high-voltage amplitude, a reduction of the negative bias voltage of tube 1 occurs, so that the anode current thereof increases and hence also the pulse amplitude at the transformer 4. The correct adjustment of the working point of the tube 1 may, if desired, be obtained by means of additional voltage sources.

The arrangement shown in FIGS. 1 and 2 brings about a material decrease in internal resistance of the high-voltage rectifying circuit of for example 8M ohms to about 1 to 1.5M ohms. A further reduction may be obtained, if the threshold value of the rectifier in the control-circuit, this rectifier being constituted by a stabilizer tube 13 in FIG. 2, is controlled in accordance with the load current of the rectifier.

Such an arrangement is shown in FIG. 3; the difference with that shown in FIG. 2 consists in that, for the sake of simplicity, the capacitive potentiometer 8, 9 is shown in the form of that of FIG. 1 and in that the controlled (negative) threshold voltage is not operative in the cathode circuit, but in the grid circuit of the control-voltage amplifying tube 17 at the point of connection of the grid leakage resistor 18.

In order to obtain this threshold bias voltage, a winding 31, which is rigidly coupled with the primary winding of the transformer 4, traversed by the anode current of tube 1, has derived from it negative fly-back pulses for example 250 v. peak voltage, which are supplied to the cathode of a rectifier 32, preferably a diode. The anode circuit thereof includes a load resistor consisting of the resistors 33 and 34, with which a smoothing capacitor 35 is connected in parallel. As an alternative, positive pulses may be employed, if these are supplied through a capacitor 36 to the anode of a parallel rectifier 37, which is otherwise connected to earth. To the smoothing capacitor 35 is then supplied the direct voltage via a series resistor 38. In the latter case, the auxiliary winding 31 may be dispensed with and the pulses may be obtained directly from the primary winding of the transformer 4.

The amplitude of the pulses supplied to the auxiliary rectifier 32 or 37 and the voltage division ratio of the resistors 33 and 34 must be chosen to be such that a bias voltage occurs at the terminal of the potentiometer 33, 34, this voltage being supplied via the leakage resistor 18 to the grid of the triode 17, of which it determines the working point.

If this bias voltage must have a comparatively high value of, for example, −85 v., whilst its variation in accordance with the load need be only small to obtain the desired decrease in internal resistance of the high-voltage rectifying circuit, it is advantageous to construct the resistor 34 as a voltage-dependent resistor, for example as a VDR-resistor. When the voltage across the capacitor 35 increases, the voltage across the resistor 34 increases only very slowly.

At the control-grid of the triode 17 are thus supplied the pulses fed back from the secondary side of the transformer 4 and the direct voltage from the auxiliary rectifier 32, which comprises a fixed part and a part varying with the amplitude of the pulses on the primary side, and, as in FIG. 2, these values are amplified, rectified and used for the adjustment of the maximum current of the pentode 1 during the interruption.

An arrangement for producing a control voltage varying with the amplitude of the primary pulses, this arrangement comprising, as shown in FIG. 3, the circuit elements 31 to 38, may be used in an arrangement shown in FIG. 1 instead of the stabilizing tube 13. In this case only few circuit elements are required.

Instead of rectifying first the pulses on the primary side, as is done in FIG. 3, and of combining subsequently, at the grid of tube 17, these pulses with the pulses on the secondary side, the pulses of the primary side and those of the secondary side may, as an alternative, be joined in the form of an alternating voltage, for example, by connecting the winding 31 directly to the resistor 18. The required threshold voltage must then be introduced in a different manner, for example by means of a cathode bias voltage for the tube 17 in a stabilizing circuit 13, 14, as shown in FIG. 2.

The pulses on the secondary side may, as an alternative, be obtained via an auxiliary winding from the transformer 4, which side must be fixedly coupled with the secondary winding, but loosely with the primary winding.

With reference to FIG. 3 it will be explained, how the proportioning of the arrangement can be calculated. For the sake of simplicity the values on the secondary side of the pulse peak voltage $U_2$ and the load current $I_2$ are transformed by the transformation ratio $ü$ of the transformer 4:

$$U_2^* = U_2/ü \text{ and } I_2^* = I_2 \cdot ü \quad (1)$$

The transformer 4 is then replaced by a transformer having a ratio of 1:1.

Since the peak voltage $U_2^*$ of the pulses on the secondary side is equal to the peak voltage $U_1$ of the pulses on the primary side (which are obtained from the fixedly coupled tertiary side) minus the voltage drop across the internal resistance $R_i^*$ produced by the transformer 4 (also related to the reduced values), we obtain:

$$U_2^* = U_1 - I_2^* \cdot R_i^* \quad (2)$$

It may furthermore be assumed that $$U_1 = Z \cdot I_1 \quad (3)$$

wherein $I_1$ is the anode peak current which is a measure for the height of the fly-back pulses at the instant of interruption and Z designates a factor (having the dimension of an impedance), in which is, moreover regarded the step-up during half the oscillatory period of the fly-back and the transformation ratio between the primary winding and the tertiary winding 31, fixedly coupled herewith.

In the proximity of the value of the anode peak current essential for the control, $$I_1 = S(U'_0 - c \cdot U_2^*) \quad (4)$$

wherein, as in the arrangements shown in FIGS. 1 and 2, it is assumed that the control takes place only in accordance with the difference between a fixed voltage $U'_0$ and part of the secondary voltage $c \cdot U_2^*$. S designates the steepness of the characteristic curve of the tube 1 at that value of the grid voltage at which the anode peak current $I_1$ occurs. The Equation 4 denotes that at a decreasing voltage on the secondary side the primary current $I_1$ increases. This results, indeed, in a voltage-dependent control in the correct direction. The factor $c$ determines the intensity of the voltage control. Since $I_1$ and S with a given amplifying tube are determined $U'_0$ can be increased, when $c$ is chosen higher to improve the control.

The control depending upon the load current is introduced since the threshold voltage $U'_0$ contains apart from a constant part $U_0$ a part varying with the factor $\alpha$ of the voltage $U_1$:

$$U'_0 = U_0 + \alpha U_1 \quad (5)$$

Then also:

$$I_1 = S(U_0 + \alpha U_1 - c \cdot U_2^*) \quad (4a)$$

By combining (3) and (4a) we obtain:

$$I_1 = \frac{SU_0 - c \cdot SU_2^*}{1 - \alpha ZS} \quad (6)$$

From (2), (3) and (6) we obtain by simple calculation:

$$U_2^* = \frac{S \cdot Z \cdot U_0}{1 + SZ(c-\alpha)} - I_2^* \cdot R_i^* \cdot \frac{1 - \alpha SZ}{1 + SZ(c-\alpha)} \quad (7)$$

$U_2^*$ is independent of the load current $I_2^*$, if:

$$\alpha SZ = 1 \quad (8)$$

Then the second term on the right-hand side of (7) becomes zero and the first term on the right-hand side becomes more simple, so that we obtain:

$$U_2^* = U_0/c \quad (9)$$

By introducing 9 into (4a), it can be calculated that:

$$\alpha U_1 = I_1/S$$

According to (4) and (4a) respectively the characteristic curve of tube 1 is almost a straight line, which can apply at the working point concerned for the anode peak current without a serious error. For practical calculations it should be considered that the negative bias voltage for example with a tube PL 36 for $I_1 = 300$ ma. and $S = 25$ ma./v. may be about $-22$ v., whilst the control-voltage (factor $U'_0$ in the Equation 4 or $U_0$ in the Equation 4a may be about $+12$ v.

Also the cut-off voltage of the control-amplifying triode 17 must be taken into consideration.

It should be noted that, as indicated in FIG. 3 to the grid of tube 17 are supplied voltages which have opposite polarity as compared with the preceding equations, since a phase inversion takes place in tube 17. It should furthermore be taken into consideration that tube 17, as a rule, produces a voltage gain $v$, so that grid voltages must be applied thereto, which may be a factor $1/v$ lower. In the preceding example $v$ is assumed to be equal to 1.

What is claimed is:

1. An electrical circuit arrangement comprising a transformer having an input circuit and an output circuit, means for producing pulses at the output circuit of said transformer comprising an amplifier element connected to said input circuit and means coupled to said amplifier element for periodically interrupting current flow through said input circuit and said amplifier element, means for rectifying the pulses at the said output circuit thereby to produce a direct voltage, and means for stabilizing the value of said direct voltage, said latter means comprising second rectifier means for deriving a control quantity having a value as determined by the intensity of said output pulses, and means for applying said control quantity to said amplifier element thereby to vary the current flow through said input circuit and said amplifier element and maintain said direct voltage substantially constant.

2. An electrical circuit arrangement as claimed in claim 1, wherein said rectifier means for deriving a control quantity having a value as determined by the intensity of said output pulses comprises a capacitative voltage divider connected to said output circuit, said capacitative voltage divider being in the form of an electrical conductor comprising a central conducting core and two concentric conducting layers and insulating medium between said layers and between the inner of said layers and the central core.

3. An electrical circuit arrangement as claimed in claim 1, wherein said means for deriving a control quantity comprises means for producing a threshold voltage, means for comparing said threshold voltage and a voltage having a value as determined by the intensity of said output pulses, thereby to produce a resultant voltage and means for applying said resultant voltage to the said second rectifier means.

4. An electrical circuit arrangement as claimed in claim 3, wherein said means for producing a threshold voltage comprises means for producing a voltage having a value as determined by the intensity of the said current flow through said output circuit.

5. An electrical circuit arrangement comprising a transformer having a primary winding and a secondary winding, means for producing pulses at the secondary winding comprising an amplifier element connected to said primary winding and means coupled to said amplifier element for periodically interrupting current flow through said primary winding and said amplifier element, means for rectifying the pulses at the said secondary winding thereby to produce a direct voltage, and means for stabilizing the value of said voltage, said latter means comprising means for deriving a first control voltage having a value as determined by the intensity of said output pulses, a tertiary winding coupled to said primary winding to a greater degree than to said secondary winding, means for deriving from said tertiary winding a second control voltage having an intensity as determined by the intensity of current flow through said primary winding, means for comparing said first and second control voltages thereby to produce a resultant control voltage, means for rectifying said resultant voltage thereby to produce a control quantity and means for applying said control quantity to said amplifier element thereby to vary the current flow through said primary winding.

6. An electrical circuit arrangement comprising a transformer having a primary winding and a secondary winding, means for producing pulses at the secondary winding of said transformer comprising an amplifier element connected to said primary winding and means coupled to said amplifier means for periodically interrupting current flow through said primary winding and said amplifier element, means for rectifying the pulses at the said secondary winding thereby to produce a direct voltage, and means for stabilizing the value of said voltage, said latter means comprising a capacitative voltage divider connected to said secondary winding for producing a first control voltage, a tertiary winding coupled to said primary winding to a greater degree than to said secondary winding for producing a second control voltage, means for rectifying said second control voltage, means for combining said first control voltage and said rectified second control voltage to produce a resultant voltage, means for rectifying said resultant voltage, and means for applying said rectified resultant voltage to said amplifier element thereby to vary the current flow through said amplifier element in a sense to maintain said direct voltage substantially constant.

References Cited in the file of this patent
UNITED STATES PATENTS

| | | |
|---|---|---|
| 2,543,632 | Hudson | Feb. 27, 1951 |
| 2,557,209 | Valeton et al. | June 19, 1951 |
| 2,591,942 | Janssen | Apr. 8, 1952 |
| 2,748,336 | Valeton et al. | May 29, 1956 |
| 2,784,367 | Van De Polder | Mar. 5, 1957 |
| 2,832,003 | Andrieu | Apr. 22, 1958 |
| 2,944,186 | Boekhorst et al. | July 5, 1960 |